United States Patent
Oh et al.

(10) Patent No.: US 11,013,013 B2
(45) Date of Patent: May 18, 2021

(54) METHOD AND DEVICE FOR SELECTING BEAM IN WIRELESS COMMUNICATION SYSTEM WHICH USES A PLURALITY OF ANTENNAS

(71) Applicant: Samsung Electronics Co., Ltd, Gyeonggi-do (KR)

(72) Inventors: Jongho Oh, Gyeonggi-do (KR); Ohyun Jo, Seoul (KR); Sungrok Yoon, Seoul (KR); Kilsik Ha, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 61 days.

(21) Appl. No.: 15/103,820

(22) PCT Filed: Dec. 11, 2014

(86) PCT No.: PCT/KR2014/012190
§ 371 (c)(1),
(2) Date: Jun. 10, 2016

(87) PCT Pub. No.: WO2015/088261
PCT Pub. Date: Jun. 18, 2015

(65) Prior Publication Data
US 2016/0316480 A1 Oct. 27, 2016

(30) Foreign Application Priority Data
Dec. 11, 2013 (KR) .................. 10-2013-0153616

(51) Int. Cl.
*H04W 72/08* (2009.01)
*H04B 7/06* (2006.01)
(Continued)

(52) U.S. Cl.
CPC ........ *H04W 72/085* (2013.01); *H04B 7/0408* (2013.01); *H04B 7/0608* (2013.01);
(Continued)

(58) Field of Classification Search
CPC .. H04B 1/3888; H04B 7/0408; H04B 7/0608; H04B 7/0695; H04B 7/0697; H04W 72/046; H04W 72/085
(Continued)

(56) References Cited

U.S. PATENT DOCUMENTS 7,899,405 B2 3/2011 Han et al.
8,121,101 B2 2/2012 Kalogridis et al.
(Continued)

FOREIGN PATENT DOCUMENTS

KR 10-2006-0066768 6/2006
KR 10-2006-0124088 12/2006
(Continued)

OTHER PUBLICATIONS

Office Action in connection with Korean Application No. 10-2013-0153616 dated Feb. 18, 2020, 15 pages.
(Continued)

*Primary Examiner* — Huy D Vu
*Assistant Examiner* — Nizam U Ahmed (57) ABSTRACT

The present invention relates to a method and a device for selecting a beam in a wireless communication system which uses a plurality of antennas such as an array antenna. A method according to one embodiment of the present invention is a method for selecting a transmission beam in a transmission device of a wireless communication device comprising a transmission device having a plurality of transmission array antennas, and a receiving device having receiving array antennas in the same number as the number of transmission array antennas, and the method comprises the steps of: determining antenna pairs by measuring the transmission rate of each of the receiving array antennas of the receiving device, individually for each array antenna; determining the number of transmission array antennas and (Continued)

individual transmission-array-antenna modes so as to transmit data according to the service requirements of data whose transmission is required, when data transmission is required; and transmitting data through the determined transmission array antennas.

12 Claims, 10 Drawing Sheets

(51) Int. Cl.
  *H04B 7/0408* (2017.01)
  *H04W 72/04* (2009.01)
(52) U.S. Cl.
  CPC ......... *H04B 7/0695* (2013.01); *H04B 7/0697* (2013.01); *H04W 72/046* (2013.01)
(58) Field of Classification Search
  USPC .......................................................... 370/252
  See application file for complete search history.

(56) References Cited

U.S. PATENT DOCUMENTS

| | | | |
|---|---|---|---|
| 8,290,503 B2 | 10/2012 | Sadek et al. | |
| 2004/0202257 A1 | 10/2004 | Mehta et al. | |
| 2005/0157807 A1 | 7/2005 | Shim et al. | |
| 2006/0105813 A1* | 5/2006 | Nakao | H04B 7/061 455/562.1 |
| 2007/0243831 A1* | 10/2007 | Seki | H04B 7/0408 455/69 |
| 2008/0247330 A1 | 10/2008 | Ko et al. | |
| 2009/0016263 A1* | 1/2009 | Kishigami | H04B 7/04 370/328 |
| 2009/0046594 A1 | 2/2009 | Zhou et al. | |
| 2010/0054180 A1* | 3/2010 | Eldering | H04W 72/046 370/328 |
| 2010/0272077 A1* | 10/2010 | van Rensburg | H04B 7/024 370/336 |
| 2011/0268049 A1* | 11/2011 | Luo | H04W 74/0833 370/329 |
| 2012/0002681 A1 | 1/2012 | Inohiza et al. | |
| 2012/0163531 A1 | 6/2012 | Zhang et al. | |
| 2013/0094440 A1* | 4/2013 | Moshfeghi | H04W 88/06 370/328 |
| 2014/0029511 A1* | 1/2014 | Park | H04L 27/2631 370/328 |
| 2014/0044042 A1* | 2/2014 | Moshfeghi | H04W 84/00 370/328 |
| 2014/0093012 A1* | 4/2014 | Zhang | H04W 52/42 375/295 |
| 2015/0124713 A1* | 5/2015 | Salhov | H01Q 3/2605 370/329 |
| 2016/0352396 A1* | 12/2016 | Seol | H04B 7/0456 |

FOREIGN PATENT DOCUMENTS

| | | |
|---|---|---|
| KR | 10-2008-0090735 A | 10/2008 |
| KR | 10-2009-0018518 | 2/2009 |
| KR | 10-2012-0048325 | 5/2012 |
| KR | 10-2012-0086331 A | 8/2012 |
| KR | 10-2013-0004668 A | 1/2013 |
| KR | 10-2013-0073551 | 7/2013 |
| WO | 2011084715 A1 | 7/2011 |

OTHER PUBLICATIONS

International Search Report dated Mar. 9, 2015 in connection with International Patent Application No. PCT/KR2014/012190, 5 pages.
Written Opinion of the International Searching Authority dated Mar. 5, 2015 in connection with International Patent Application No. PCT/KR2014/012190, 5 pages.
Decision of Patent dated Sep. 23, 2020 in connection with Korean Patent Application No. 10-2013-0153616, 10 pages.
Xu, Zhikun, et al., "Energy-Efficient MIMO-OFDMA Systems based on Switching Off RF Chains," Vehicular Technology Conference (VTC Fall), 2011 IEEE, Sep. 5, 2011, pp. 1-5, XP032029590.
Communication from foreign patent office in counterpart foreign application, European Patent Office, "Supplementary European Search Report," Application No. EP 14 87 0164, dated Jul. 11, 2017, 10 pages.

* cited by examiner

100: Transmission Device
711~713: Beams
200: Reception Device

METHOD AND DEVICE FOR SELECTING BEAM IN WIRELESS COMMUNICATION SYSTEM WHICH USES A PLURALITY OF ANTENNAS

CROSS-REFERENCE TO RELATED APPLICATIONS

This application is a 371 of International Application No. PCT/KR2014/012190 filed on Dec. 11, 2014, which claims priority to Korean Patent Application No. 10-2013-0153616 filed on Dec. 11, 2013, the disclosures of which are herein incorporated by reference in their entirety.

BACKGROUND

1. Field

The present invention relates to a method and device for selecting a beam in a wireless communication system using a number of antennas such as an array antenna.

2. Description of Related Art

In wireless communication systems, a technology using a number of antennas has been implemented with various types and they are widely used. For example, a system may be implemented in such a way that an identical signal is transmitted or received via a number of antennas, thereby obtaining an antenna diversity gain. Alternatively, a system may be implemented in such a way that different signals are transmitted or received via a number of antennas, thereby increasing in data transmission efficiency. Alternatively, a system is implemented in such a way as to perform beamforming where a beam is formed in a particular direction by manipulating an array antenna, thereby creating good channel condition.

Of the methods using a number of antennas, a beamforming method is described below. An example of a wireless communication system using a beamforming scheme is an IEEE 802.11ad system. The IEEE 802.11ad system performs beamforming using a Sector Level Sweep (SLS), a Beam Refinement Protocol (BRP), and Beam Tracking.

For protocols used by other wireless communication systems, their detailed processes differ from each other; however, the beamforming method defined in the standard is a method of selecting an optimum beam from among a number of available candidate beams. For example, a conventional method is performed in such a way that: all selectable beams are transmitted one-by-one, one of them, which has the highest value in Signal to Noise Ratio (SNR) or Received Signal Strength Indicator (RSSI), is selected; and the selected beam is used for data communication.

The method of selecting one of the beams defined in the various standards of wireless communication systems may not be optimal in a dual channel or multi-channel environment. This is because a method of selecting an optimum beam is not defined for two independent antennas according to scenarios. More specifically, a method of selecting a beam which has the highest value of SNR or RSSI may be the optimal method for a single channel. However, in a dual channel or multi-channel environment, an optimum beam according to scenarios may be selected using information regarding antennas used in individual channels, instead of selecting a beam which has the highest value of SNR or RSSI.

The present invention has been made to address the above problems and disadvantages, and to provide at least the advantages described below. Accordingly, the present invention provides a method and apparatus for selecting a beam capable of multi-channel, according to service requirements, when a wireless communication system uses a number of antennas.

The present invention further provides a method and apparatus for distinguishing between beam section modes according to service requirements when a wireless communication system uses a number of antennas.

The present invention further provides a method and apparatus for improving performance of a wireless communication system using a number of antennas, using correlation between the beam directions used by the individual antennas.

The present invention further provides a method and apparatus for reducing overhead by beamforming when a wireless communication system uses a number of antennas.

SUMMARY

In accordance with an aspect of the present invention, a method of selecting a transmission beam by a transmission device which has a number of transmission array antennas and is included in a wireless communication system is provided. the method includes: measuring transmission rates by the transmission array antennas, and paring the transmission array antennas with reception array antennas of a reception device; when data is requested to be transmitted, determining the number of transmission array antennas and modes by transmission array antennas which need to perform transmission, according to service requirements of the data requested for transmission; and transmitting the data via the determined transmission array antenna.

In accordance with another aspect of the present invention, a beam selection device using a number of antennas in a wireless communication system is provided. The device include: two or more transmission array antennas capable of beamforming in a number of directions; radio frequency (RF) processors for transmitting data to the individual transmission array antennas; baseband processors for coding data of a baseband for transmission and outputting the individual RF processors; a MAC processor for splitting the data to be transmitted, according to the beamforming characteristics of antennas and outputting the split data; and a controller for: measuring transmission rates by the transmission array antennas, and paring the transmission array antennas with reception array antennas of a reception device; determining, when data is requested to be transmitted, the number of transmission array antennas and modes by transmission array antennas which need to perform transmission, according to service requirements of the data requested for transmission; and transmitting the data via the determined transmission array antenna.

The method and apparatus according to the present invention is capable of using a number of channels, in various modes, according to service requirements, and selecting optimum beams for individual channels. The method and apparatus is capable of distinguishing beam selections according to service requirements and improving performance by correlating beam directions used by individual antennas. The method and apparatus is capable of reducing overhead by beamforming. The method and apparatus is capable of obtaining a multiple path gain using diversity when performing beamforming and also increasing the probability of maintaining a corresponding service despite the degradation of a specific channel, thereby guaranteeing the continuity of service and improving the quality of service for users.

DETAILED DESCRIPTION

Various embodiments of the present invention are described in detail referring to the accompanying drawings. The same reference numbers are used throughout the drawings to refer to the same or similar parts. It should be understood that the accompanying drawings are merely provided to assist in a comprehensive understanding of the invention and thus the form, arrangement, etc. are not used to limit the invention. Detailed descriptions of well-known functions and structures incorporated herein may be omitted to avoid obscuring the subject matter of the invention.

In the present disclosure along with the accompanying drawings, a number of antennas form an array of antennas, i.e., an array antenna. Each of the array antennas refers to antennas capable of beamforming in two or more directions. The term a 'single antenna' refers to 'one array antenna.' The terms 'antenna,' array antenna,' beamforming antenna,' transmission array antenna,' reception array antenna,' 'transmission beamforming array antenna,' reception beamforming array antenna,' etc. are used to focus on the characteristics of a corresponding antenna. For example, a beamforming antenna is used for an antenna when it is described, emphasizing beamforming as a characteristic. A transmission beamforming antenna is used for an antenna when it is described along with a transmission device, emphasizing beamforming as a characteristic. Therefore, it should be understood that the antenna (array antenna) used in the present disclosure is configured in the same form but is called different names according to corresponding characteristics.

Figure 1:
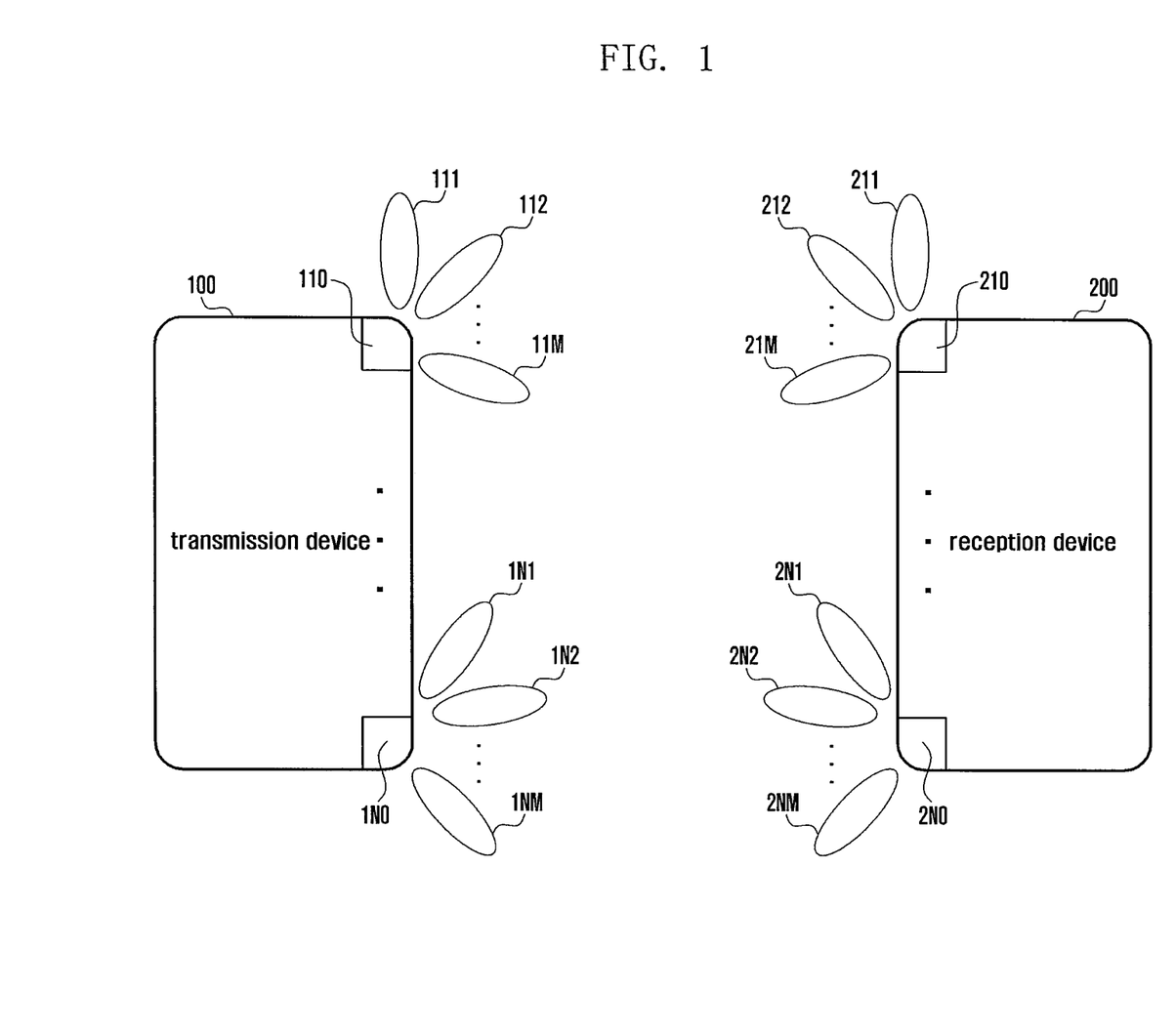
FIG. 1 shows diagrams of a transmission device and a reception device in a wireless communication system, according to the present invention.

FIG. 1 shows diagrams of a transmission device and a reception device in a wireless communication system, according to the present invention.

Referring to FIG. 1, the wireless communication system includes a transmission device 100 and a reception device 200. The transmission device 100 and the reception device 200 include array antennas 110, . . . , 1N0, and 210, . . . , 2N0, respectively, where each array antenna is capable of forming two or more beams. It is assumed that the number of array antennas 110, . . . , 1N0 of the transmission device 100 is identical to that of array antennas 210, . . . , 2N0 of the reception device 200.

As shown in FIG. 1, each of the array antennas 110, . . . , 1N0 is capable of performing beamforming in a number of directions that differ from each other. For example, a first beamforming array antenna 110 is capable of beamforming in a number of directions 111, 112, . . . , 11M, and an $N^{th}$ beamforming array antenna 1N0 is capable of beamforming in a number of directions 1N1, 1N2, . . . , 1NM. Similarly, a first beamforming array antenna 210 is capable of beamforming in a number of directions 211, 212, . . . , 21M and an $N^{th}$ beamforming array antenna 2NM is capable of beamforming in a number of directions 2N1, 2N2, . . . , 2NM.

The array antennas 110, . . . , 1N0 of the transmission device 100 pair the array antennas 210, . . . , 2N0 of the reception device 200, correspondingly and respectively, and they communicate with each other. For example, a first beamforming array antenna 110 of the transmission device 100 pairs a first beamforming array antenna 210 of the reception device 200 and thus establishes a communication channel therewith, so that they can communicate with each other via the communication channel.

Figure 2:
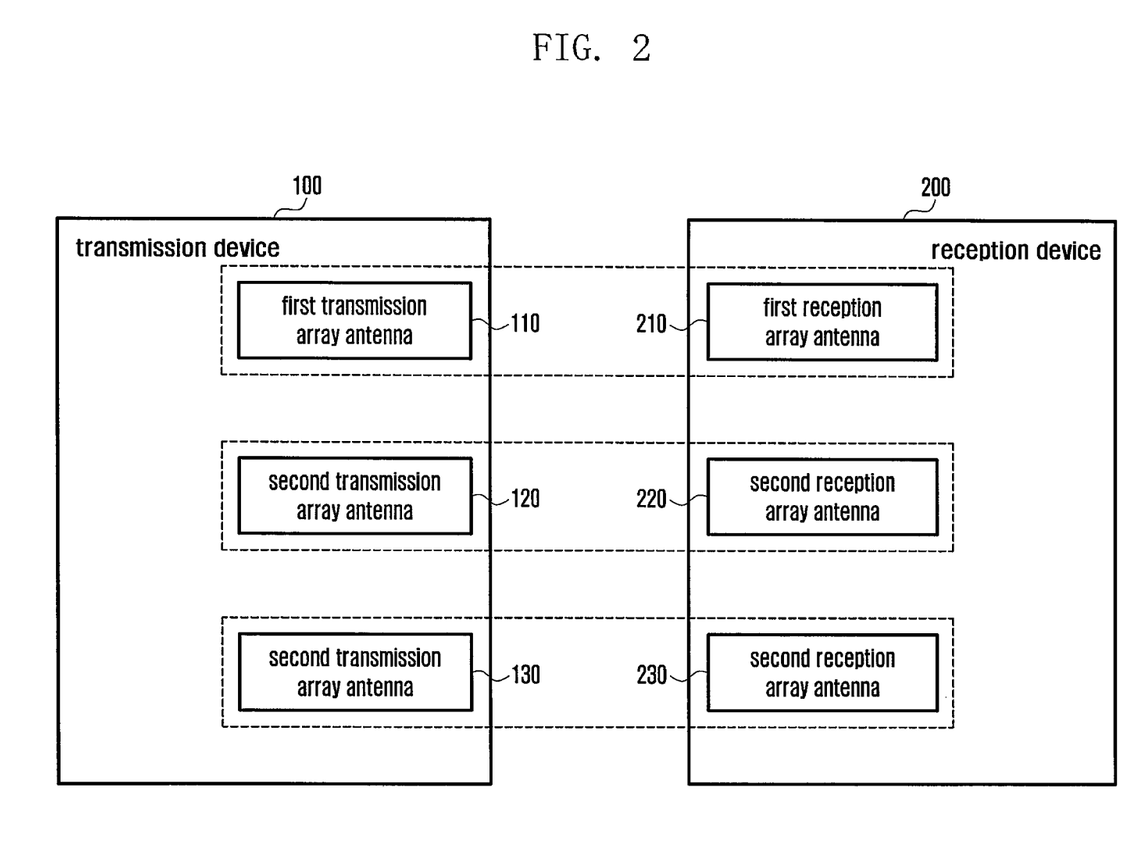
FIG. 2 is a diagram that describes communication channels established between antennas of a transmission device and a reception device in wireless communication mode, according to the present invention.

FIG. 2 is a diagram that describes communication channels established between antennas of a transmission device and a reception device in wireless communication mode, according to the present invention.

Referring to FIG. 2, it is assumed that the transmission device 100 includes three beamforming array antennas 110, 120, and 130, and the reception device 200 includes three beamforming array antennas 210, 220, and 230. It is also assumed that the array antennas 110, 120, and 130 of the transmission device 100 pair the array antennas 210, 220, and 230 of the reception device 200, correspondingly and respectively.

More specifically, the first transmission array antenna 110 pairs with the first reception array antenna 210; the second transmission array antenna 120 pairs with the second reception array antenna 220; and the third transmission array antenna 130 pairs with the third reception array antenna 230.

Although the embodiment shown in FIG. 2 is implemented in such a way that the transmission array antennas 110, 120, and 130 pair the reception array antennas 210, 220, and 230, correspondingly and respectively, it should be understood that they may also be paired with each other in another order, establishing communication channels. For example, the first transmission array antenna 110 of the transmission device 100 may pair with the third reception array antenna 230 of the reception device 200; the second transmission array antenna 120 may pair with the first reception array antenna 210; and the third transmission array antenna 130 may pair with the second reception array antenna 220. It would be appreciated by the skilled person in the art that the transmission array antennas and the reception array antennas may be paired with each other in any other types.

As shown in FIG. 2, when the transmission device 100 and the reception device 200 form pairs of antennas therebetween and transmit/receive data to/from each other via the pairs of antennas, they may be set in a spatial multiplexing (SM) mode or diversity mode (DM), according to a reliability and a transmission rate, required for data to be transmitted. An optimum beam may be set or reset with respect to the individual pairs of antennas, based on information regarding beams of adjacent antennas according to the individual modes, which will be described, in detail, later referring to the flowcharts.

The transmission device 100 may inform the reception device 200 of a set mode via a control signal. In order to inform set modes according to individual antennas, separate data needs to be transmitted. For example, a particular type of data not in use, i.e., data with a reserved field, may be used to inform of set mode.

The following table 1 is an example of the use of one bit of the bits in the Reserved Field of Sector Sweep Feedback Field.

TABLE 1

| B0 | B5 | B6 | B7 | B8 | B15 | B16 | B17 | B23 |
|---|---|---|---|---|---|---|---|---|
| Sector Select | | DMG Antenna Select | | SNR Report | | Poll Required | Reserved | |
| Bits: 6 | | 2 | | 8 | | 1 | 7 | |

In table 1, the block represents one bit that is located at a particular location in the reserved field and indicates a set mode according to a corresponding antenna. For example, when the bit is '1,' it indicates that the set mode refers to a spatial multiplexing mode (SM). Similarly, when the bit is '0,' it indicates that the set mode refers to a diversity mode (DM).

Figure 3:
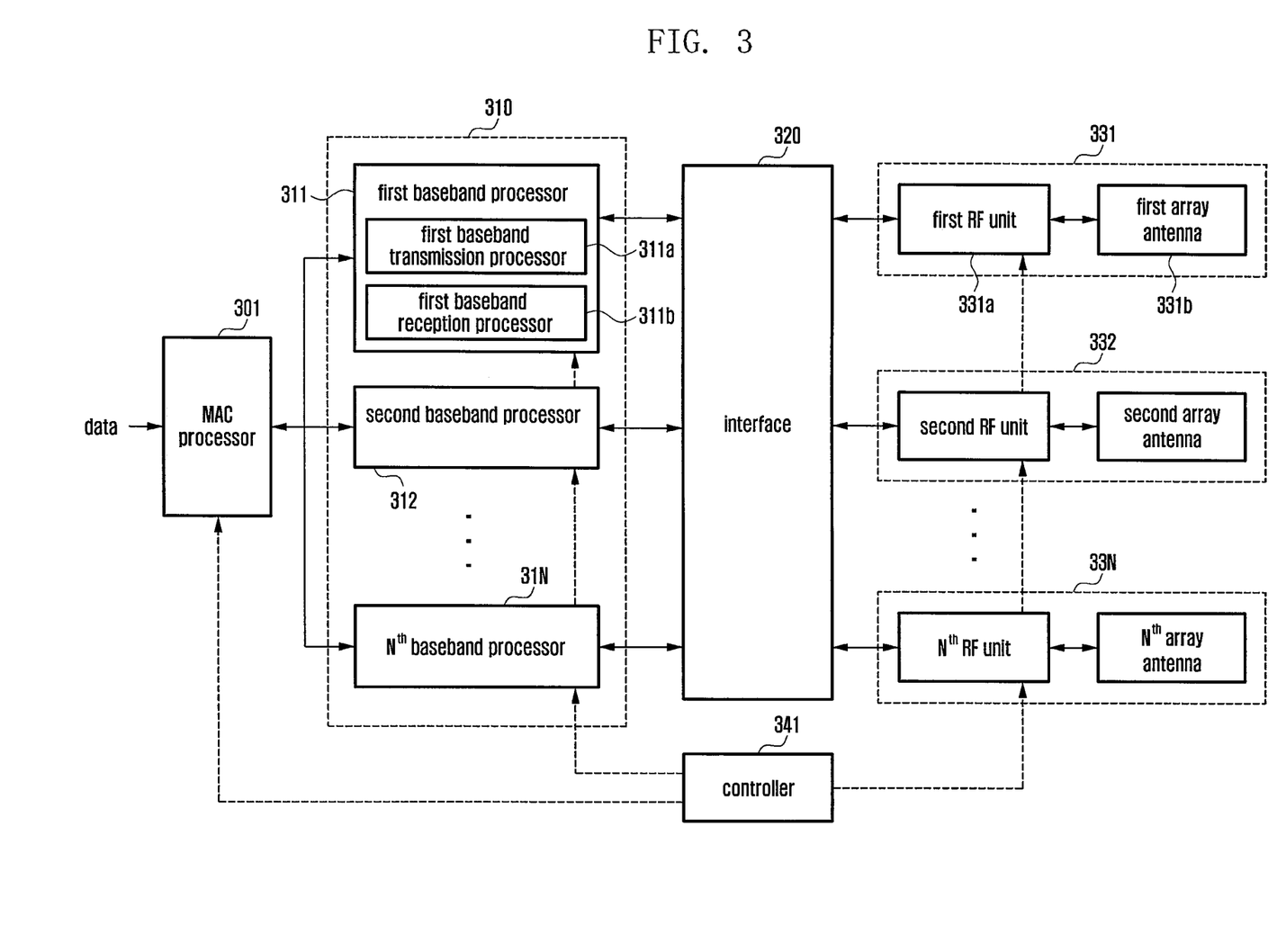
FIG. 3 is a block diagram showing the configuration of a transmission device according to an embodiment of the present invention.

FIG. 3 is a block diagram showing the configuration of a transmission device according to an embodiment of the present invention.

Referring to FIG. 3, the transmission device 100 is capable of including a MAC processor 301, a baseband processor 310, an interface 320, a controller 341 and a number of radio frequency (RF) processors 331, 332, ..., and 33N.

The MAC processor 301 is capable of receiving, from an upper layer, data related to one or more services to be transmitted, and splits data related to a corresponding service by the number of antennas that will perform the transmission. For example, when the MAC processor 301 receives, from an upper layer, data related to one service to be transmitted and ascertains that it can transmit the data via one transmission array antenna, it outputs the data. On the other hand, when the MAC processor 301 receives, from an upper layer, data related to one service to be transmitted and ascertains that it can transmit the data via two or more transmission array antennas, it splits the data by the number of transmission array antennas and then outputs the split data. The MAC processor 301 is capable of further processing the split data or the received data to be transmitted so that the individual transmission array antennas transmit the processed data via beamforming. Although it is not shown in FIG. 3, the MAC processor 301 is capable of including a beam forming process unit and a splitter for splitting data received from an upper layer.

The baseband processor 310 is capable of including baseband processors 311, 312, ..., 31N corresponding to the number of transmission array antennas. Since it is assumed that the number of antennas is N in the embodiment referring to FIG. 1, the embodiment referring to FIG. 3 is implemented, assuming that the number of baseband processors 311, 312, ..., 31N is N. Since the baseband processors 311, 312, ..., 31N are implemented to have the same configurations, the following description provides a detailed explanation regarding a first baseband processor 311.

The first baseband processor 311 is capable of including a first baseband transmission processor 311a and a first baseband reception processor 311b. The first baseband transmission processor 311a is capable of including a coder, a constellation mapper and a pulse shaper, used in a wireless communication system. The coder may be one of the coders employing various coding schemes, e.g., a convolution coder, a turbo coder, an LDPC coder, etc., which meets a condition of a corresponding wireless communication system.

The first baseband reception processor 311b is capable of including a synchronizer, an equalizer, a combiner, and a decoder. The decoder may be a decoder to meet a condition of a corresponding wireless communication system.

The interface 320 makes interaction between the baseband processor 310 and a number of RF processors 331, 332, ..., 33N, via frequency bands for transmission/reception. Transmission frequency bands may differ from each other according to antennas or a transmission frequency band may differ from a reception frequency band. In this case, the interface 320 coordinates between the baseband processor 310 and a number of RF processors 331, 332, ..., 33N, with the frequency bands.

RF processors 331, 332, ..., 33N may be implemented to have the same configurations. The following description provides a detailed explanation regarding a first RF processor 331. The first RF processor 331 up-converts a baseband signal to a transmission RF band via the first RF unit 331a, and transmits the processed signal via the first array antenna 331b. In this case, the first array antenna 331b is capable of beamforming and transmitting the signals via the beamforming scheme.

The transmission device 100 may serve as a reception device 200. As shown in FIG. 3, when the transmission device 100 serves as a reception device, it is capable of receiving signals of a preset RF band in a particular beam direction via the first array antenna 331b. The first RF unit 331a is capable of converting the signals, received in a particular beam direction via the first array antenna 331b, into a baseband signal. The first RF unit 331a may convert a baseband signal into a signal of a transmission band via a direct-conversion scheme or a super-heterodyne scheme.

The controller 341 determines whether transmission is performed via a single antenna or two or more antennas, according to the transmission amount of service data and/or the required quality of service. The controller 341 checks channel states between antennas of the reception device 200 and antennas of the transmission device 100 and determines pairs of antennas based on the checked result. The controller 341 is capable of setting modes according to transmission antennas. Operations of the controller 341 are described in detail later referring to the accompanying drawings.

Figure 4:
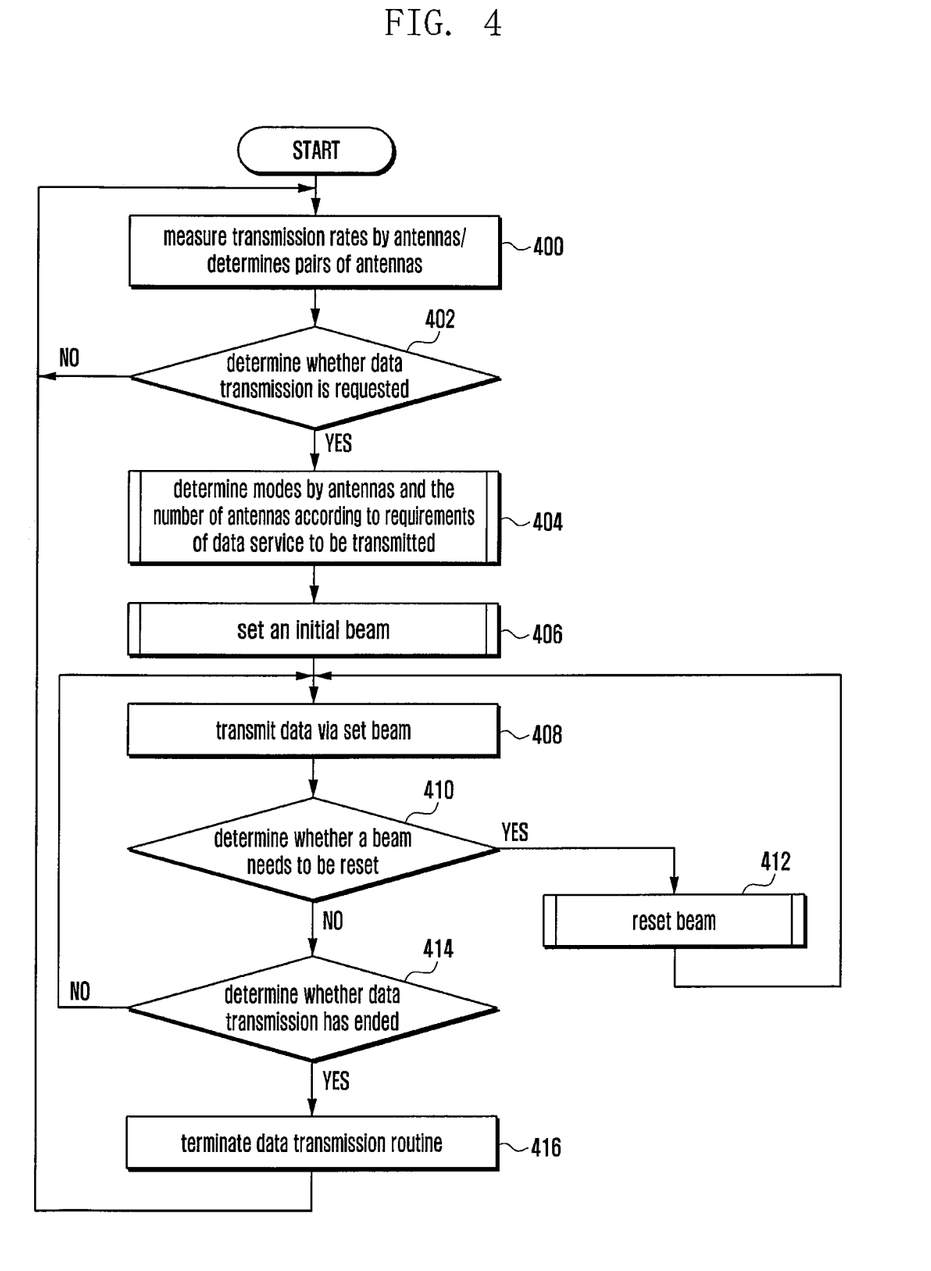
FIG. 4 is a flowchart that describes a method of controlling the transmission of data in a transmission device with a number of array antennas according to the present invention.

FIG. 4 is a flowchart that describes a method of controlling the transmission of data in a transmission device with a number of array antennas according to the present invention.

The embodiment referring to FIG. 4 is described, assuming that the number of transmission antennas and reception antenna is three, respectively, as in the embodiment referring to FIG. 2. However, it should be understood that the embodiment may also be modified in such a way that the number of transmission antennas and reception antennas is two, respectively, or four or more, respectively, forming pairs of antennas, and transmission/reception of data is performed, according to the schemes which will be described below.

The controller 341 measures transmission rates to reception antennas according to transmission antennas, respectively, and determines pairs between antennas 110, 120, and 130 of the transmission device 100 and antennas 210, 220, and 230 of the reception device 200 in operation 400. The antenna pair determining process may be performed in a unit of a preset period or when data transmission is requested. In the following description, for the sake of convenience, it is explained assuming that the antenna pair determining process is performed in a unit of a preset period.

The measurement of transmission rates, which can be provided when establishing channels between transmission antennas and reception antennas respectively in operation 400, may be performed in such a way as to measure: a transmission rate and an optimum channel which can be established with the first reception array antenna 210 via a number of beams transmitted by the first transmission array antenna 110; a transmission rate and an optimum channel which can be established with the second reception array antenna 220 via a number of beams transmitted by the first transmission array antenna 110; and so on. Optimum beams may be preset according to individual reception antennas included in the reception device 200, with respect to each of the transmission antennas. Through these processes, an optimum array antenna may be set as one of the array antennas included in the reception device 200 pairs with a first transmission array antenna 110.

According to operation 400, the first transmission array antenna 110 pairs with the first reception array antenna 210; the second transmission array antenna 120 pairs with the second reception array antenna 220; and the third transmission array antenna 130 pairs with the third reception array antenna 230 as shown in FIG. 2. In the following description, for the sake of convenience, it is assumed that the transmission array antennas and the reception array antennas pair with each other.

In a state where the pairs of antennas are determined and the transmission rates of the individual pairs of antennas are measured as in operation 400, the controller 341 determines whether data transmission is requested in operation 402. The data transmission is performed for data related to only one service or data related to two or more services. An example of a request for transmission of data related to two or more services is a case that transmission of FTP service data using the Internet is requested and simultaneously transmission of video data (including image data and audio data) is requested.

When the controller 341 ascertains that data transmission is not requested in operation 402, it returns to operation 400.

On the other hand, when the controller 341 ascertains that data transmission is requested in operation 402, it determines modes by antennas (a mode of a corresponding antenna) and the number of antennas according to requirements of data service to be transmitted in operation 404. As described above in the previous embodiment, a mode of a corresponding antenna may be a spatial multiplexing (SM) mode or diversity mode. A detailed description regarding the process of determining a mode of a corresponding antenna and the number of antennas according to requirements of data service to be transmitted in operation 404 will be provided later referring to FIG. 5.

When determining modes by antennas (a mode of a corresponding antenna) and the number of antennas in operation 404, the controller 341 sets an initial beam in operation 406. The process of setting an initial beam includes searching for an optimum beam according to modes by antennas and setting a beam to transmit/receive data between paired antennas. Setting an initial beam and resetting a beam are described in detail later referring to FIG. 6.

When setting an initial beam in operation 406, the controller 341 transmits data via the set beam in operation 408. After that, the controller 341 determines whether a beam needs to be reset in operation 410. The period of checking the need for beam resetting may be set as a time interval, e.g., 1 ms, 5 ms, etc., or a frequency of transmission of a packet, e.g., once, thrice, etc.

The case that a beam needs to be reset in operation 410 may be a situation that channels of pairs of antennas between the transmission device 100 and the reception device 200 vary during the transmission of data. For example, when an obstacle is created between a transmission array antenna and a reception array antenna or other adjacent electronic devices are performing communication, channel conditions may vary. A condition as to whether a beam needs to be reset is determined based on the following factors: Error Vector Magnitude (EVM), Signal to Noise Ratio (SNR), Received Signal Strength Indicator (RSSI), Channel State Information (CSI), and Packet Error Rate (PER)/Bit Error Rate (BER). When information containing one or more of the following: EVM, SNR, RSSI, CSI, and PER/BER is greater than or equal to a preset threshold, this is considered to satisfy a condition of determining a transmission beam determining condition. That is, when the channel state is reliably performing communication, this is considered to meet a condition of determining a transmission beam.

When the controller 341 ascertains that a beam needs to be reset in operation 410, it re-performs the process for setting a beam described above, in operation 412. The process of operation 412 may be similar or identical to a process of setting an initial beam. A detailed description regarding the process of re-setting a beam will be explained in detail later referring to FIG. 6.

On the other hand, when the controller 341 ascertains that a beam does not need to be reset in operation 410, it determines whether data transmission has ended in operation 414. When data transmission has ended in operation 414, the controller 341 performs a procedure related to the end of data transmission with respect to the reception device 200 in operation 416 and then returns to operation 400. On the other hand, when data transmission has not ended in operation 414, the controller 341 returns to operation 408 and continues transmitting data via the set beam.

Figure 5:
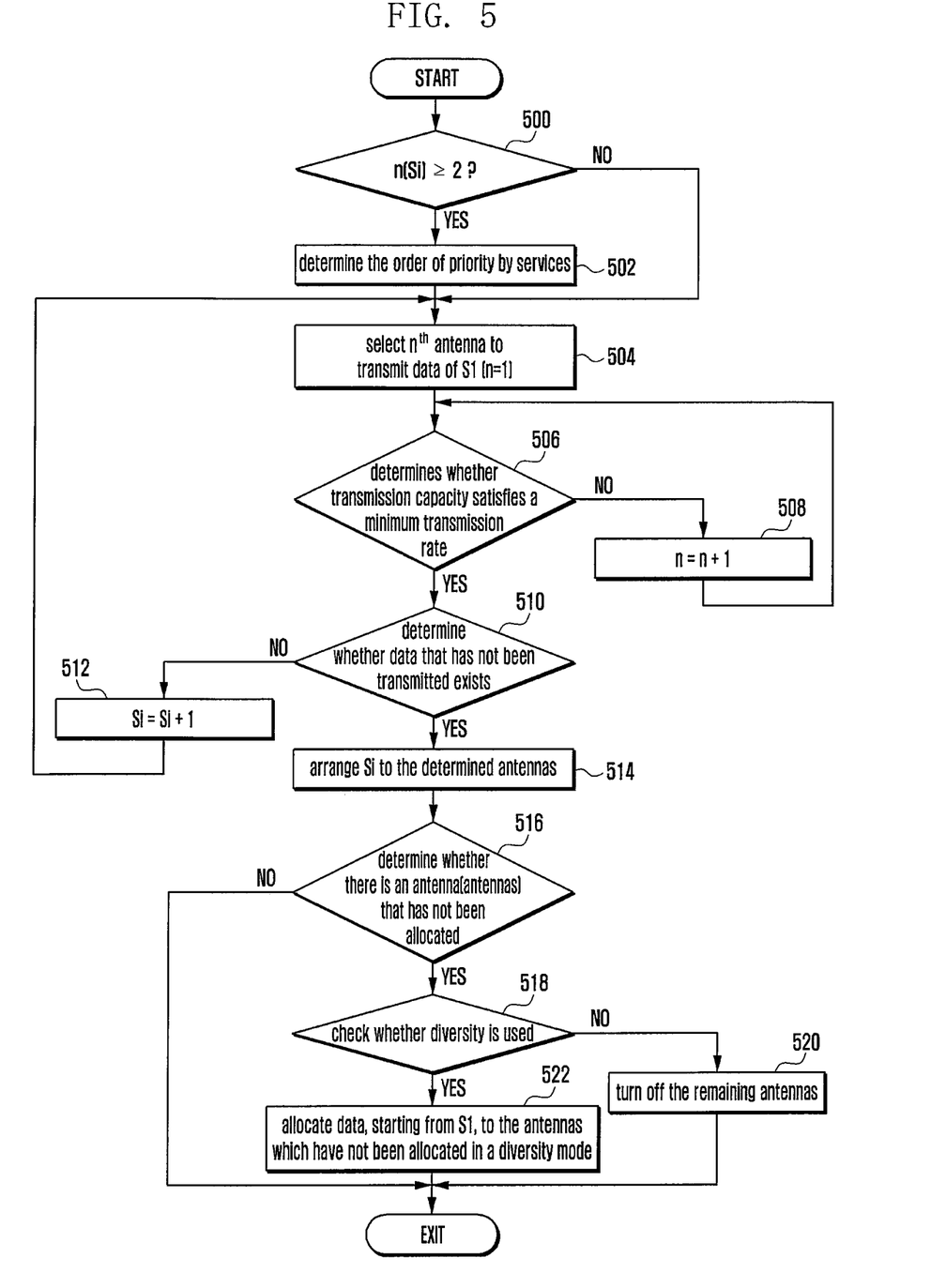
FIG. 5 is a flowchart that describes a method of controlling the determination of a mode according to antennas and the number of antennas, based on requirements of data transmitted from a transmission device, according to an embodiment of the present invention.

FIG. 5 is a flowchart that describes a method of controlling the determination of a mode according to antennas and the number of antennas, based on requirements of data transmitted from a transmission device, according to an embodiment of the present invention.

When data transmission is requested, the controller 341 needs to determine a mode of a corresponding antenna and the number of antennas according to requirements of data service to be transmitted as in operation 404 of FIG. 4.

In this case, the controller 341 determines whether the number (Si) of service data items required for transmission is greater than or equal to two in operation 500. When the controller 341 ascertains that the number (Si) of service data items is one in operation 500, it proceeds with operation 504 which will be described below.

On the other hand, when the controller 341 ascertains that the number (Si) of service data items is greater than or equal to two in operation 500, it determines the order of priority by services in operation 502. The order of priority by services may be set according to types of required service and a minimum data transmission rate which needs to be guaranteed. For example, a service which needs to be provided in real time may be set to have a high priority. In addition, a high priority may be set for data with a large minimum data transmission rate which needs to be guaranteed. For example, when service data with minimum guaranteed transmission rates of 300 kbps and 500 kbps exists, the service data with a minimum guaranteed transmission rate of 500 kbps may be set to have a higher priority than the other. Order of priority may be defined as a standard protocol or set during the process of manufacturing or designing products.

When three different types of data services are requested, one service with the highest priority may be set as Si; another service with the next highest priority may be set as S2; and the other service with the lowest priority may be set as S3. When the order of priority for services is determined in operation 502, the controller 341 proceeds with operation 504.

When only one service exists or the order of priority for two or more services is determined in operation 502, the controller 341 is capable of selecting an $n^{th}$ antenna to transmit data of S1 in operation 504. When n is set as 1, the first antenna is set so that it transmits data of Si.

After setting an antenna in operation 504, the controller 341 is capable of checking whether the transmission capacity via the currently set antenna satisfies a minimum transmission rate or a basic transmission rate for a corresponding service in operation 506. The basic transmission rate may be equal to the minimum transmission rate or greater than the minimum transmission rate by a certain size.

When the controller 341 provides the basic transmission rate via a selected antenna in operation 506, it proceeds with operation 510. On the other hand, when the controller 341 does not provide the basic transmission rate via a selected antenna in operation 506, it increases the value of n to allocate two or more antennas in operation 508 and then returns to operation 506. When the controller 341 performs operation 508 and then checks whether the transmission capacity via the currently set antenna satisfies a minimum transmission rate or a basic transmission rate for a corresponding service in operation 506, this may be a process of checking whether the transmission rate of a pair of a first antenna and a second antenna satisfies the basic transmission rate. When the transmission rate of a pair of a first antenna and a second antenna does not satisfy the basic transmission rate in operation 506, the controller 341 increases the number of antennas.

When one antenna or two or more antennas are allocated to transmit data of one service, i.e., when a corresponding antenna establishes a channel with an antenna of the reception device and transmits data via the channel at a basic transmission rate, the controller 341 proceeds with operation 510.

The controller 341 checks whether data that has not been transmitted exists in operation 510. For example, an example of the case where data that has not been transmitted exists in operation 510 is a case where data of one service is allocated via a single antenna and there is data of two or more types of service to be transmitted. When the controller 341 ascertains that data that has not been transmitted exists in operation 510, it increases the number value of data to be transmitted, i.e., Si, in operation 512, and then performs operations 504 to 510. Since there is an antenna that been set in operation 504, n may be a value by addition of the number of set antennas, which is not 1. For example, when two antennas are allocated to S1, n may be 3 in performing determination with respect to data of S2.

When the number of antennas to perform transmission for each of the services is determined via the processes describes above, the controller 341 arranges data of services to the determined antennas in operation 514. For example, when only one service needs to be transmitted and it is transmitted via a single antenna, S1 may be allocated to a first transmission array antenna 110. As another example, when one service needs to be transmitted via two or more array antennas, Si may be allocated to first and second transmission array antennas 110 and 120, respectively. When two types of services are allocated to two antennas respectively, Si and S2 may be allocated to first and second transmission array antennas 110 and 120, respectively. When one of two types of services is allocated to two antennas and the other one is allocated to a single antenna, S1, S2 and S3 may be allocated to first, second and third transmission array antennas 110, 120 and 130, respectively.

After arranging data of services in operation 514, the controller 341 determines whether there is an antenna (antennas) that has not been allocated in operation 516. When one service is transmitted via a single antenna or two antennas and the transmission device 100 includes three array antennas, the two antennas or a single antenna may be antennas that have not been allocated.

When the controller 341 ascertains that there is not an antenna that has not been allocated in operation 516, it terminates the routine. Terminating the routine refers to the process of ending operation 404 of FIG. 4.

On the other hand, when the controller 341 ascertains that there is an antenna that has not been allocated in operation 516, it checks whether diversity is used in operation 518. A condition as to whether diversity will be used may be preset by the user or in the process of manufacturing the transmission device 100. When the controller 341 ascertains that diversity is used in operation 518, it sets the antennas which have not been allocated in a diversity mode in operation 522, and then terminates the routine. On the other hand, when the controller 341 ascertains that diversity is not used in operation 518, it turns off antennas that have not been allocated in operation 520 and then terminates the routine. In the following description, a detailed description regarding a method of setting a beam when diversity is used is provided referring to FIG. 6.

Figure 6:
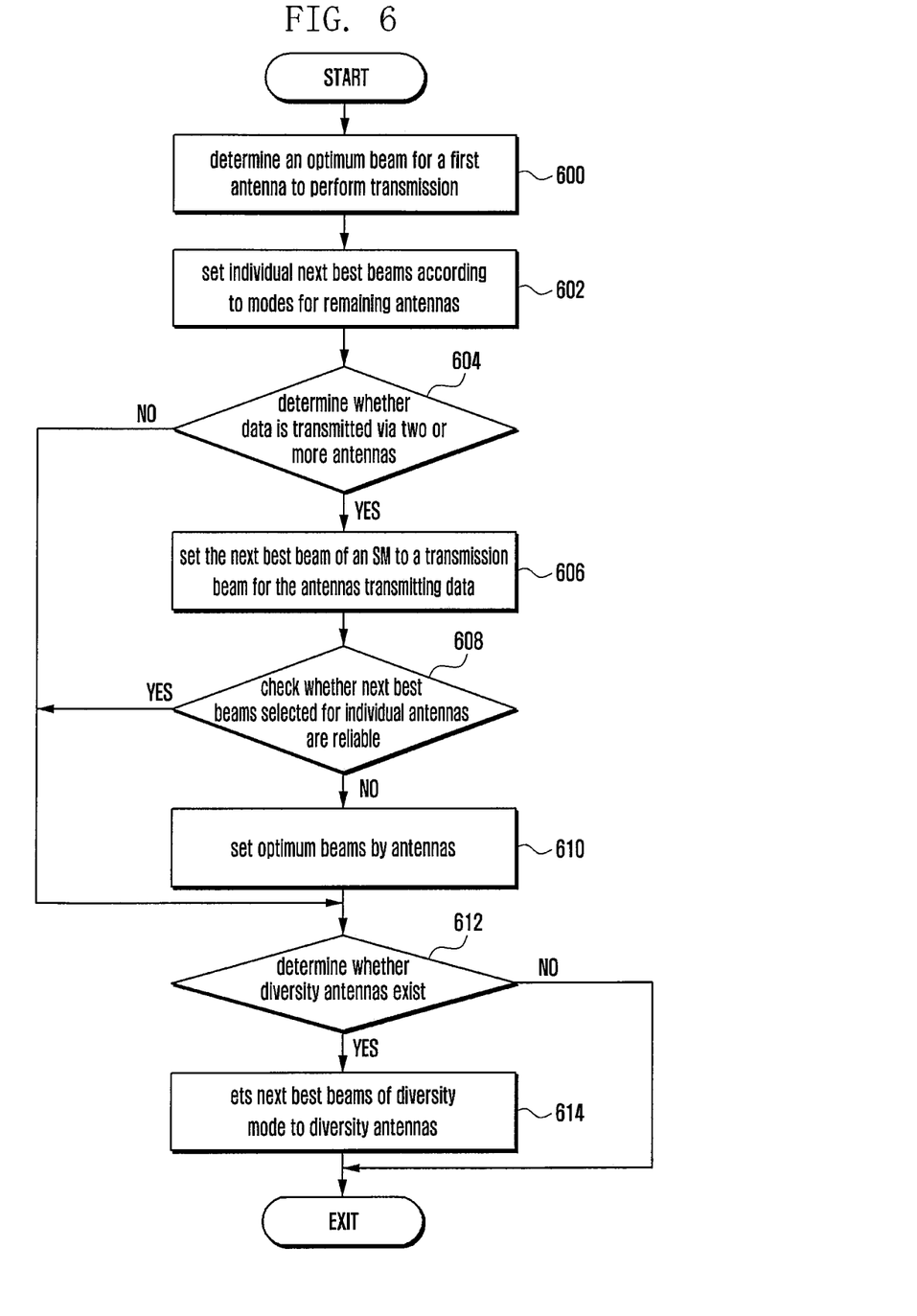
FIG. 6 is a flowchart that describes a method of controlling the setting of an initial beam or the resetting of a beam in a transmission device, according to an embodiment of the present invention.

FIG. 6 is a flowchart that describes a method of controlling the setting of an initial beam or the resetting of a beam in a transmission device, according to an embodiment of the present invention.

In the embodiment referring to FIG. 6, a case that an initial beam is set and a case that a beam is re-set while data is transmitted via a particular antenna (antennas) are processed by the same operations. Referring to FIG. 6, a method of forming a beam toward a reception device 200 via a particular antenna (antennas) is described.

The controller 341 determines an optimum beam for one (single) of the antennas to perform transmission, e.g., a first antenna, in operation 600. An optimum beam may be determined by comparing Error Vector Magnitude (EVM), Signal to Noise Ratio (SNR), Received Signal Strength Indicator (RSSI), and Channel State Information (CSI) with each other. Determining an optimum beam is to select a beam which has one of the highest values of EVM, SNR, RSSI, and CSI.

The controller 341 sets individual next best beams according to modes for remaining antennas except for the first antenna in operation 602. When a particular antenna operates in a diversity mode, its next best beam may be set as one of the beams whose Error Vector Magnitude (EVM), Signal to Noise Ratio (SNR), Received Signal Strength Indicator (RSSI), Channel State Information (CSI), etc. are greater than a threshold and which has a largest angle difference from the optimum beam. Alternatively, when a particular antenna operates in an SM, its next best beam may be set to be identical to the first optimum beam. A beam of a largest angle difference is selected as the next best beam for an antenna operating in diversity mode, and this is performed to obtain the largest diversity gain.

As described above, when optimum beams for the remaining antennas are determined to be identical to an optimum beam for the first antenna, this may indicate that the channel states of the remaining antennas are similar to the channel state of the first antenna. For example, it is assumed that a first transmission array antenna 110 is paired with a first reception array antenna 210 and the line of sight beam from the first transmission array antenna 110 to the first reception array antenna 210 is in an optimal state. When a second transmission array antenna 120 is set as an antenna for transmitting data, a line of sight beam from the second transmission array antenna 120 to a second reception array antenna 220 pairing with the second transmission array antenna 120 is also set as an optimum beam.

When the optimum beam and the next best beam are determined, the controller 341 determines whether data is transmitted via two or more antennas in operation 604. As described above, the transmission of data via two or more antennas may be implemented in such a way that: one item of data is transmitted via two or more antennas or two or more items of data are transmitted via antennas that differ from each other.

When data is transmitted via two or more antennas in operation 604, the controller 341 proceeds with operation 606. When data is not transmitted via two or more antennas in operation 604, the controller 341 proceeds with operation 612. In operation 606, the controller 341 sets the next best beam of an SM to a transmission beam for the antennas transmitting data. After that, the controller 341 checks whether next best beams selected for individual antennas are reliable in operation 608. Checking the reliability of the next base beam refers to the process of determining the reliability of the next best beam set for each of the antennas, based on Error Vector Magnitude (EVM), Signal to Noise Ratio (SNR), Received Signal Strength Indicator (RSSI), Channel State Information (CSI), etc. For example, the reliability of the next base beam may be determined by checking whether the beam satisfies a transmission beam determining condition.

When next best beams set for individual antennas are reliable in operation 608, the controller 341 proceeds with operation 612. When next best beams set for individual antennas are not reliable in operation 608, the controller 341 proceeds with operation 610.

In operation, the controller 341 sets optimum beams for antennas, respectively. When a channel state does not vary greatly and the interval between the antennas of the transmission device 100 and those of the reception device 200 is not relatively large, the next best beam for each of the antennas is likely to be the optimum beam. Therefore, although there is an environment as if the next best beam is used as the optimum beam for the remaining antennas except for a particular antenna, the present invention is capable of performing transmission of data without any problems.

As the transmission device is set in such a way that the optimum beam is selected only for a single antenna and the next best beam is selected for the remaining antennas, it may not perform a procedure for setting an optimum beam for each of the antennas. This allows the transmission device 100 to reduce a time for selecting optimum beams for individual antennas and also unnecessary overhead between the transmission device 100 and the reception device 200.

When data is not transmitted via two or more antennas in operation 604 or when next best beams set for individual antennas are reliable in operation 608, the controller 341 checks whether a diversity mode antenna exists in operation 612. The process of checking whether a diversity antenna exists may be a process to check whether one or more antennas, set in diversity mode and not turned off, exist from among the antennas that have not been used as described above referring to FIG. 5. When the controller 341 ascertains that a diversity mode antenna exists in operation 612, it sets the antenna so that it operates in diversity mode, according to the order of priority, and then ends the routine in operation 614. To this end, the next best beam may be used.

On the other hand, when the controller 341 ascertains that a diversity mode antenna does not exist in operation 612, it ends the routine. That is, the routine is ended after the initial beam is set as in operations 406 and 408 or after a beam is reset as in operations 412 and 408.

As described above, the present invention is capable of selecting an optimum beam capable of making the utmost use of multi-channels according to service requirements. When a single link satisfies the offered load of all sources, the present invention is capable of simultaneously transmitting the same data via a number of channels to guarantee the continuity of services. When a number of links need to be used for satisfying the offered load of all sources, the present invention is capable of simultaneously transmitting a number of items of data via a number of channels, and also simultaneously transmitting a signal of high priority via the remaining channels, while transmitting a number of items of data as satisfying the offered load.

The present invention is capable of variously using a number of channels according to service requirements based on scenarios described above, and efficiently selecting optimum beams for channels respectively.

In the following description, a system with the transmission device 100 and the reception device 200 according to the present invention is explained in detail referring to FIGS. 7A to 7D.

FIGS. 7A to 7D show diagrams that describe the transmission of data by antennas of a system with a transmission device and a reception device according to the present invention.

Figure 7A:
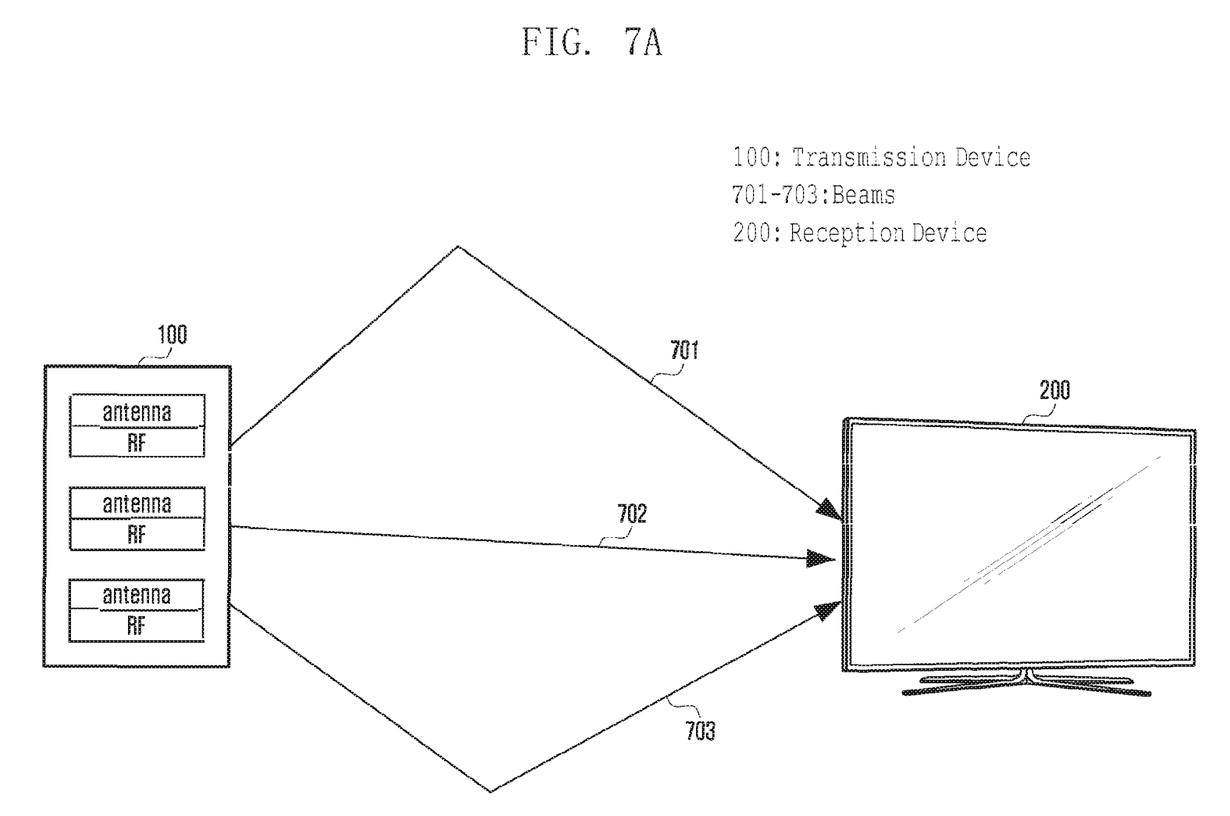
FIGS. 7A to 7D show diagrams that describe the transmission of data by antennas of a system with a transmission device and a reception device according to the present invention.

Referring to FIG. 7A, it is assumed that the transmission device 100 includes three transmission array antennas. Therefore, the reception device 200 may also include three reception array antennas (not shown).

FIG. 7A shows a diagram describing a case where data is transmitted by only a single antenna as a second antenna. When data is transmitted by only a single antenna, the antenna selects the optimum beam as described above. FIG. 7A shows a case where a first antenna and a third antenna select the next best beams 701 and 703 and data is transmitted in diversity mode via the next best beams. In this case, as described above, the first antenna and the third antenna: set, as a next best beam, a beam which has a largest angle difference from the optimum beam of the second antenna, from among the beams whose Error Vector Magnitude (EVM), Signal to Noise Ratio (SNR), Received Signal Strength Indicator (RSSI), Channel State Information (CSI), etc. are greater than a threshold; and perform transmission of data.

Figure 7B:
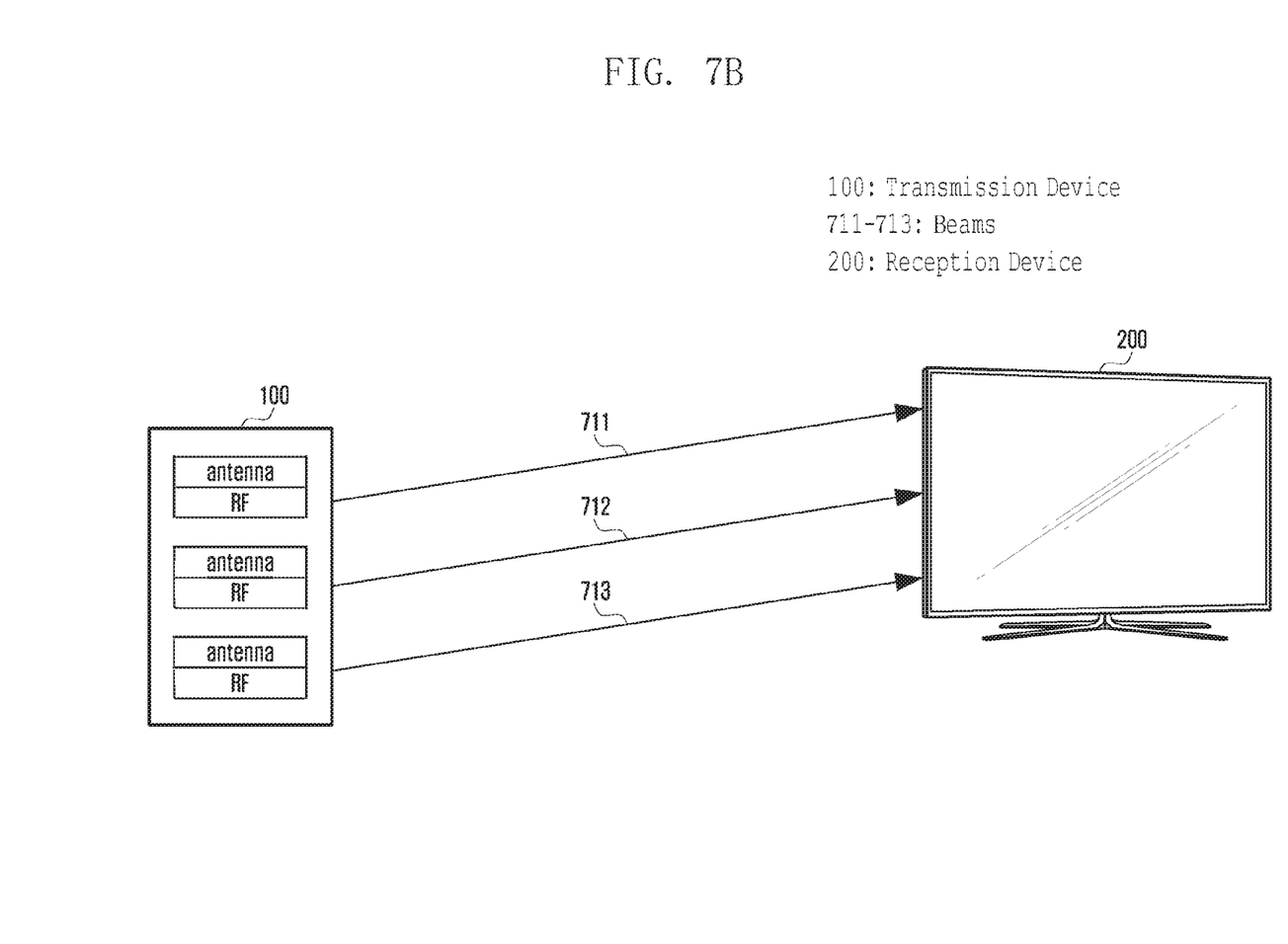

Referring to FIG. 7B, first, second and third antennas: are set in SM; set the beams 711, 712, and 713 in the same direction; and perform transmission. When the beam 711 transmitted from the first antenna to the reception device 200 is an optimum beam, the next best beams of the second and third antennas may select a beam in the same direction and perform transmission as described above.

Figure 7C:
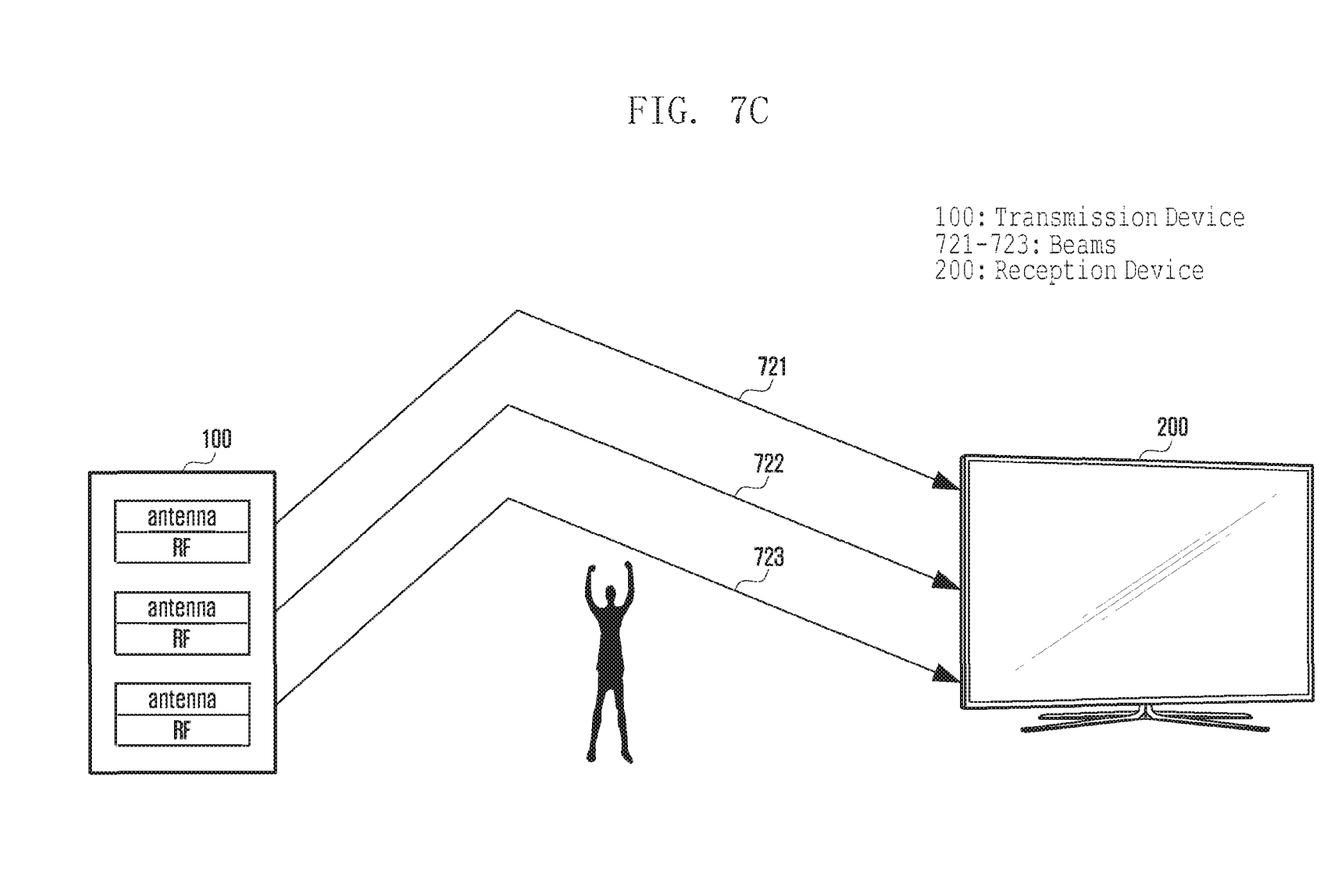

Referring to FIG. 7C, when an obstacle exists in FIG. 7B, this alters the traveling paths of all the beams. In addition, when the first antenna selects a beam 721 set as an optimum beam, traveling in the direction due to an obstacle, the second and third antennas also select beams 722 and 723 as the next best beams, traveling the same direction as the beam 721. After that, the antennas perform transmission.

Figure 7D:
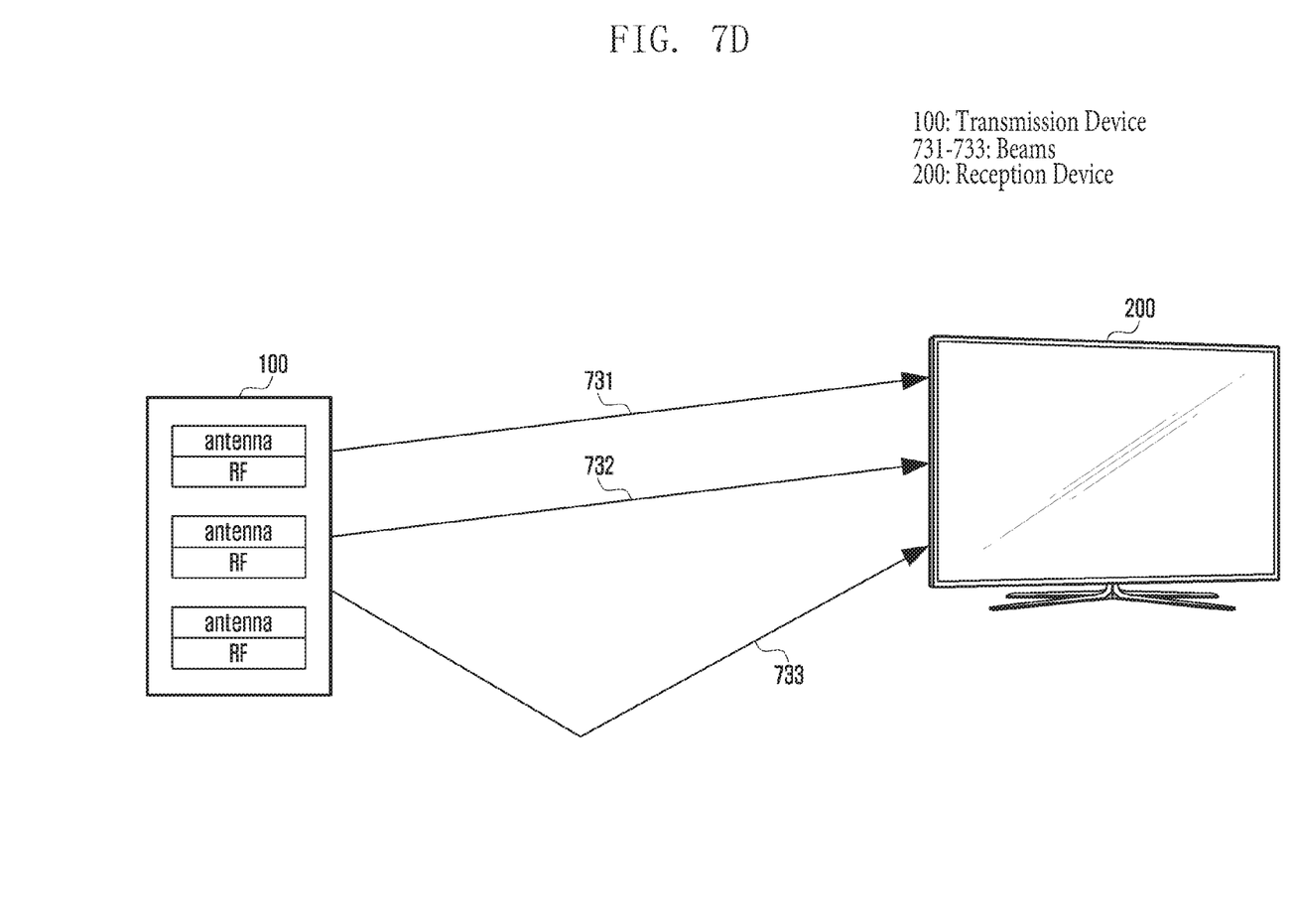

Referring to FIG. 7D, the first and second antennas of the transmission device 100 are set in an SM and perform transmission to the reception device 200 via the beams 731 and 732. The third antenna transmits either one of the data items, transmitted via the two antenna, in diversity mode. In this case, the antenna operating in diversity mode determines one of the two antennas to transmit data in diversity mode, first, according to the order of priority or the requested reliability.

As described above, the method of selecting beams according to the present invention can be applied to wireless communication systems employing a number of array antennas and also cellular systems. In particular, the method can also be applied to systems for training search-based beams such as 802.11ad.

The embodiments of the present invention described in the description and drawings are merely provided to assist in a comprehensive understanding of the invention and are not suggestive of limitation. Although embodiments of the invention have been described in detail above, it should be understood that many variations and modifications of the basic inventive concept herein described, which may be apparent to those skilled in the art, will still fall within the spirit and scope of the embodiments of the invention as defined in the appended claims.

The present invention is applied to wireless communication systems employing a number of antennas such as an array antenna.

The invention claimed is:

1. A method of a transmitter for selecting a transmission beam in a wireless communication system, the method comprising:
    configuring two or more beam pairs based on a measured transmission rate between a plurality of transit beams and a plurality of receive beams, wherein the plurality of transit beams is beam-formed from the transmitter to a receiver, and the plurality of receive beams is beam-formed to receive data at the receiver, the transmitter including transmission array antennas and the receiver including reception array antennas;
    determining, by the transmitter, a mode and a number of the beam pairs for transmitting data based on service requirements of the data, wherein the mode comprises a spatial multiplexing (SM) mode or a diversity mode (DM);
    determining a number of transmit beams based on the determined number of the beam pairs; and
    transmitting the data via the determined number of transmit beams using the determined mode,
    wherein each of the beam pairs is determined based on a transmission rate between a transmit beam and a receive beam, and
wherein each beam pair is determined individually for each transmission array antenna,
    wherein the service requirements of the data comprises conditions as to whether the data is serviced in real-time, a size of data, and a minimum guaranteed transmission rate, when a number of types of data service is greater than or equal to two, allocating one or more paired transmit beams beam pairs according to the types of data services; and
    wherein, the types of data services are priorities.

2. The method of claim 1, further comprising:
    re-setting the beam pairs when a transmit beam reset is required while the data is transmitted.

3. The method of claim 1, wherein determining the number of the beam pairs comprises allocating the beam pairs so that every data of individual types of services satisfies service requirements.

4. The method of claim 3, further comprising:
    when a beam pair that has not been allocated for transmitting the data exists, checking whether the DM is set; and
    when the DM is set, allocating a beam pair that has not been allocated to a diversity antenna, according to an order of priority of types of services.

5. The method of claim 4, further comprising:
    when the DM is not set, turning off a transmission array antenna that has not been allocated.

6. The method of claim 1, further comprising:
    when two or more beam pairs are allocated to transmit one type of service data, setting the allocated two or more beam pairs to the SM.

7. A transmitter using a number of antennas in a wireless communication system, the transmitter comprising:
    two or more transmission array antennas, each of the transmission array antenna capable of beamforming in a number of directions;
    radio frequency (RF) processors configured to transmit data to the two or more transmission array antennas;
    baseband processors configured to code data of a baseband for transmission and outputting the RF processors;
    a medium access control (MAC) processor configured to split the data to be transmitted according to beamforming characteristics of antennas and outputting the split data; and
    a controller configured to:
        configure two or more beam pairs based on each measured transmission rate between a plurality of transit beams and a plurality of receive beams, wherein the plurality of transit beams is beam-formed from the transmitter to a receiver, and the plurality of receive beams is beam-formed to receive data at the receiver, the transmitter including transmission array antennas and the receiver including reception array antennas;
        determine, by the transmitter, a mode and a number of beam pairs for transmitting the data based on service requirements of the data, wherein the mode comprises a spatial multiplexing (SM) mode or a diversity mode (DM);

determine a number of transmit beams based on the determined number of the beam pairs; and transmit the data via the determined number of transmit beams using the determined mode, wherein each of the beam pairs is determined based on a between a transmit beam and a receive beam, wherein each beam pair is determined individually for each transmission array antenna, wherein the service requirements of the data comprises conditions as to whether the data is serviced in real-time, a size of data, and a minimum guaranteed transmission rate, when a number of types of data service is greater than or equal to two, allocating one or more paired transmit beams beam pairs according to the types of data services; and wherein the types of date services are priorities.

8. The transmitter of claim 7, wherein the controller resets, if a transmit beam reset is required while the data is transmitted, the beam pairs.

9. The transmitter of claim 7, wherein the controller is further configured to allocate, when determining the beam pairs, the beam pairs so that every data of individual types of services satisfies service requirements.

10. The transmitter of claim 9, wherein the controller is further configured to:

check whether the DM is set when a beam pair that has not been allocated for transmitting the data exists; and allocate, when the DM is set, a beam that has not been allocated to a diversity antenna, according to an order of priority of types of services.

11. The transmitter of claim 9, wherein, when the DM is not set, the controller is configured to turn off a transmission array antenna that has not been allocated.

12. The transmitter of claim 7, wherein, when two or more beam pairs are allocated to transmit one type of service data, the controller is further configured to set the allocated two or more beam pairs to the SM.

* * * * *